June 30, 1959      B. GRAHAM      2,892,586
MATHEMATICAL INSTRUMENT FOR DIVIDING ANGLES INTO EQUAL
PARTS AND FOR PERFORMING RELATED
MATHEMATICAL OPERATIONS
Filed Aug. 17, 1956

INVENTOR.
BENJAMIN GRAHAM,
BY
ATTORNEY.

United States Patent Office 2,892,586
Patented June 30, 1959

2,892,586
MATHEMATICAL INSTRUMENT FOR DIVIDING ANGLES INTO EQUAL PARTS AND FOR PERFORMING RELATED MATHEMATICAL OPERATIONS

Benjamin Graham, Beverly Hills, Calif.

Application August 17, 1956, Serial No. 604,794

5 Claims. (Cl. 235—61)

This invention relates to mathematical instruments, and more particularly to a device for rapidly and accurately dividing angles into equal parts, and for performing related mathematical operations.

A principal object of the invention is to provide a novel and improved protractor device especially designed to divide angles into any number of equal parts without measurements or calculations, said device being simple in construction, easy to operate, and adapted, additionally, to perform a large number of other mathematical operations.

A further object of the invention is to provide an improved mathematical instrument which may be employed for performing a variety of mathematical operations, including dividing angles into a desired number of equal parts, dividing lines into equal parts, dividing and multiplying numbers, extracting square roots of numbers, drawing parallels or perpendiculars to a given line through a given point, obtaining trigonometric functions of angles, and for providing guide points for drawing properly proportioned geometrical figures for use in school work or for other purposes.

A still further object of the invention is to provide an improved mathematical instrument which, in addition to the foregoing, may be used as an ordinary protractor, compass and ruler.

Further objects and advantages of the invention will become apparent from the following description and claims, taken together with the accompanying drawings, wherein Figure 1 is a plan view of an angle dividing instrument constructed in accordance with the present invention.

Figure 1:
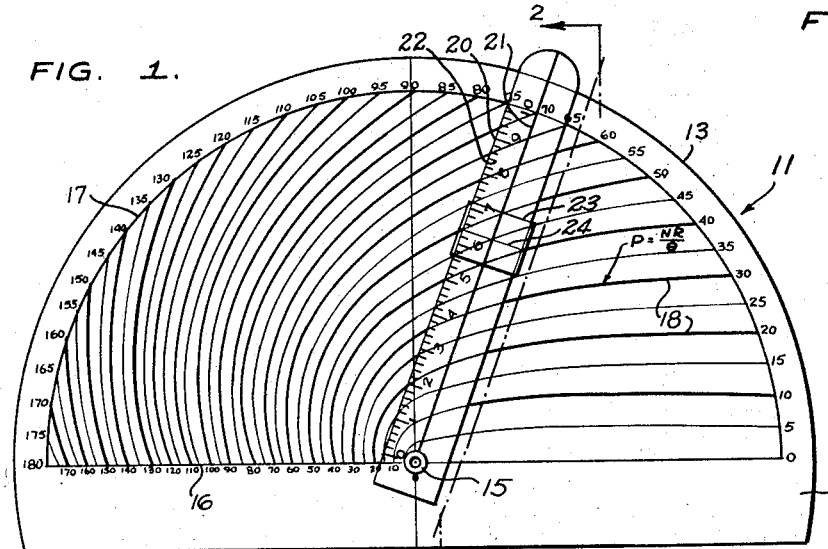
Figure 2:
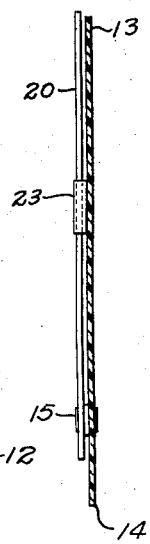
Figure 2 is a sectional view of the instrument, taken along the line 2—2 of Figure 1, with parts shown in elevation.

Referring now to the drawings, and more particularly to Figures 1 and 2, 11 generally designates a mathematical instrument for dividing angles, according to the present invention. The instrument comprises a body 12 which may be formed of transparent, rigid, sheet material, such as Lucite, or similar transparent plastic material, said body 12 having an arcuate top edge 13 and a straight bottom edge 14. Bottom edge 14 is located a short distance below the center 15, as viewed in Figure 1, of the arcuate edge 13.

A base line 16, parallel to bottom edge 14, is inscribed on body 12, said base line extending through and being bisected by the center 15. A semi-circular margin line 17 is inscribed on body 12, inwardly adjacent to and concentric with the edge 13.

The semi-circular margin line 17 is marked off in angle values around the center 15, as in the manner of an ordinary protractor, said values being in suitable increments such as in increments of 5 or 10 degrees. A numerical angle scale from 0° to 180° is provided on the marginal portion of body 12 adjacent the respective angle markings, as shown.

Inscribed on body 12 are a plurality of hyperbolic spirals 18, each having its origin at the center 15 and each having its outer termination at one of the angle markings on the semi-circular margin line 17. Thus, there are a definite number of spirals distributed around the body 12, and the formula for the radips $\rho$ to any point on a spiral, for example, the Nth spiral, will be given by (1) $$\rho = \frac{NR}{\theta}$$

where:

$\rho$ is the radial distance from the origin 15 to the selected point;

N is the degree number of the spiral appearing at the intersection of the spiral with the semi-circle 17;

R is the radius distance from center 15 to semi-circle 17; and $\theta$ is the angle measured counterclockwise from base line 16 to the selected point.

It will be apparent that the value R is the same for all the spirals 18, and that the value N can be read from the angle scale adjacent the marginal semi-circle 17. Therefore, the ratio between any two radii $\rho_A$ and $\rho_B$ will be given by $$\frac{\rho_A}{\rho_B} = \frac{\frac{N_A R}{\theta_A}}{\frac{N_B R}{\theta_B}}$$

or (2) $$\frac{\rho_A}{\rho_B} = \frac{\theta_B N_A}{\theta_A N_B}$$

where:

$N_A$ is the angle number for the spiral on which $\rho_A$ is taken;

$N_B$ is the angle number for the spiral on which $\rho_B$ is taken;

$\theta_A$ is the angle of $\rho_A$; and $\theta_B$ is the angle of $\rho_B$.

Designated at 20 is a flat transparent arm which is pivoted to body 12 at 15 for rotation parallel to said body and which extends a short distance beyond edge 13. Arm 20 is inscribed with a straight median line 21 passing through center 15 and with a numerical scale 22 at the left or right side thereof, as viewed in Figure 1, of uniform graduations, for example, from zero at center 15 to 100 at semi-circle 17, as shown.

Slidably mounted on arm 20 is a transparent, flat index sleeve member 23 inscribed at its intermediate portion with a transverse index line 24 which overlies the center line 21 at right angles thereto. It will readily be apparent that any desired radius $\rho$ may be measured off along scale 22 by means of index sleeve 23 and index line 24.

From Equation 2 above, it will be seen that the ratio between any two angles $\theta_B$ and $\theta_A$ can be readily found, since $$\frac{\theta_B}{\theta_A} = \frac{\rho_A N_B}{\rho_B N_A}$$

Thus, the device may be employed to divide a given angle $\theta_A$ into a desired number of parts, say X parts, in the following manner:

The device 11 is placed over the sheet of paper, for example, showing the angle, with the center 15 at the vertex thereof and with line 16 registering with one side of the angle. Arm 20 is rotated so that line 21 registers with the other side of the angle. Sleeve 23 is adjusted so that line 24 registers with the intersection of line 21 and any spiral 18, whose N number is evenly divisible into X parts (For example, if X=5, the selected spiral could be a multiple of 5, such as 50°.) Arm 20 is then rotated towards zero until the intersection of lines 24 and and 21 overlies the spiral whose N number is the next lower multiple X−1. (This would be 40° in the above example.) A mark is then made on the paper at the outer end of line 21. Arm 20 is then rotated toward zero until the intersection of lines 24 and 21 overlies the spiral whose N number is the next succeeding lower multiple X−2. (This would be 30° in the above example.) Another mark is then made on the paper at the outer end of line 21. This procedure is followed until the angle is completed. Lines are then drawn from the marked points through the vertex of the angle, defining the desired angular divisional segments.

In the above example of use of the device, $\rho_A$ is always equal to $\rho_B$ and $$N_B = N_A - \frac{N_A}{X}$$

for the first step. $N_C$, for the next step would be given by $$N_C = N_A - 2\frac{N_A}{X}$$

and so forth.

From the above, it can easily be shown that $$\theta_A - \theta_B = \frac{\theta_A}{X}$$

Figure 3:
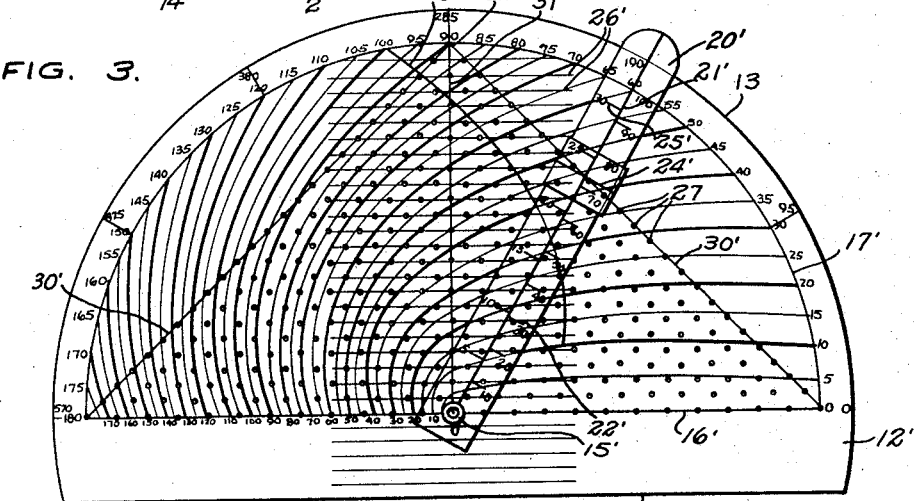
Figure 3 is a plan view of a modified form of mathematical instrument according to the present invention.

Figure 3 illustrates a modified form of the invention wherein the instrument, designated at 11', comprises a flat, transparent body 12' having the arcuate top edge 13' and the straight bottom edge 14'. The body is inscribed with the semi-circle 17' and the diameter 16', which is bisected by the center point 15'. The body is inscribed with the hyperbolic spirals 18' having their origins at point 15'. As in the previously described form of the invention, the spirals intersect the semi-circle at 17' at actual angular values with respect to the base line 16' given by the inner set of numerals shown adjacent the semi-circle 17' between said semi-circle and the arcuate outer edge 13'.

An additional angle scale is inscribed in the margin between semi-circle 17' and edge 13', said scale consisting of numerals from zero to 570, as shown, and representing the product of the normal angle numerals and the square root of 10. Thus, adjacent the normal angle marking "30" appears the numeral "95" of the additional angle scale, which is 30 times the square root of 10, to an approximation well within the range of accuracy of the instrument.

Pivoted to body 12' at 15' for rotation parallel to said body is the transparent arm 20' having the center line 21' inscribed thereon and passing through center 15'. Inscribed on arm 20' at the right side of line 21', as viewed in Figure 3, is the uniformly calibrated numerical scale 22' similar to scale 22 in Figure 1. Scale 22' extends from zero to 100, as shown.

Inscribed on arm 20' at the left side of line 21' is another numerical scale 25', representing the values of scale 22' multiplied by the square root of 10.

The body 12' is further inscribed with a series of parallel lines 26', of substantial length and separated by uniform spacings, such as by spacings of ⅛ inch, the lines 26' extending parallel to the base line 16' and extending over substantially the entire vertical height of the body 12', namely from its top to its bottom.

Parallel rows of equidistant apertures 27' are provided in the body 12' in the inscribed right triangular area having the sides 30', 30', and having its right angle at the 90 degree point on semi-circle 17' and its other corners respectively at the zero and 180° points on said semi-circle. The apertures 27' are arranged in rows parallel to the base line 16' and are vertically staggered, as shown, since the spacing between the rows is uniform, the apertures are equidistant from each other in the respective rows, and consequently, the number of apertures in the rows increases as the base line 16' is approached.

Inscribed on body 12' is a square root curve 28' beginning at the 100 degree mark on semi-circle 17' and terminating at a point on the 10 degree spiral. The equation of this curve is given by $$\rho = \sqrt{N}$$

where $\rho$ is the distance from the origin to any point on curve 28' and N is a dependent variable representing the numbers of the spirals from the 10 degree spiral to the 100 degree spiral.

A transparent sleeve member 23' is slidably mounted on the arm 20'. Sleeve 23' has inscribed thereon the transverse index line 24', as in the form of the invention shown in Figures 1 and 2.

The device of Figure 3 is employed in the same manner as the device of Figures 1 and 2 to divide an angle into a desired number of equal parts. To divide a given line into any number of parts, the body 12' is placed over the given line so that its extremities lie on the respective sides 30', 30' of the right triangular area within which the parallel lines 26' are located and so that the given line is parallel to the lines 26'. A mark is made through the aperture at the 90° corner of said triangular area and additional marks are made through the apertures of the row having the same number of spaces between its apertures 27' as the number of parts into which it is desired to divide the given line. The device 11' is then removed and the top mark is then joined to the additional marks by drawing lines therethrough of by using a straight edge. The drawn lines or straight edge will intersect the given line at points corresponding to the desired division into parts of said given line.

Since by construction the spiral members adjacent the semi-circle are the corresponding angle values, the equation for the spiral numbers is given by:

$$N = \theta$$

Therefore, the ratio of the two numbers $$\frac{N_1}{N_2}$$

is equal to the ratio of their corresponding angle values, namely $$\frac{\theta_1}{\theta_2}$$

however, at a given angle $\theta$, the ratio of two numbers $$\frac{N_1}{N_2} = \frac{\rho_1}{\rho_2}$$

where $\rho_1$ is the radius to the spiral having the spiral number $N_1$ and $\rho_2$ is the radius to the spiral having the spiral number $N_2$.

Thus, numbers may be divided or multiplied by the device, using the right scale 22' of arm 20' to give the ratio $$\frac{\rho_2}{\rho_1}$$

and using the angle scale adjacent semi-circle 17' to give the numbers, $N_1, N_2$ or $\theta_1, \theta_2$. For example, to divide 76 by 81, the arm 20' is placed so that line 21' intersects semi-circle 17' at the 81° point and the sleeve 23' is adjusted so that marker 24' lies over the spiral having a spiral number of 76. The answer, in this case .94 approximately, is read from calibrated scale 22'.

To multiply .94 by 81, the arm 20' would again be placed so that line 21' intersects semi-circle 17' at the 81° point and the sleeve 23' is adjusted so that marker 24' is at the .94 point on scale 22'. The answer, 76, is the number of the spiral over which the intersection of marker 24' with line 21' rests.

Alternatively, and especially for numbers with smaller significant digits, the left scale on arm 21' and the outer scale beyond semi-circle 17' may be used. To multiply 53.2 by 26.7, place arm 20' so that line 21' intersects semi-circle 17' at the outer 532 point, and the sleeve 23' is adjusted so that marker 24' is at the 26.7 point to the left of line 21'. The answer, 142, is the number of the spiral over which the intersection of marker 24' with line 21' rests.

The device may be employed to extract square roots by employing the square root curve 28'. To extract the square root of a given number, arm 20' is adjusted so that the line 21' overlies the intersection of square root curve 28' with the spiral of the given number. The answer is obtained by adjusting sleeve 23' so that index line 24' overlies the above intersection. The answer is given by either scale 22' or 25', depending upon whether the number of digits to the left of the decimal point of the given number is odd or even.

The device may be employed to perform various geometrical constructions. For example, to draw a parallel to a given line through a given point, using the parallel lines 26', the body 12' is placed over the given line so that said given line is parallel to base edge 14' and so that edge 14' goes through the given point. The required parallel line may be then drawn using edge 14' as a guide. To draw a perpendicular to a given line through a given point, the center line, shown at 31', of the device 11', is placed over the given line with the base edge 14' going through the given point. The required perpendicular may then be drawn along edge 14'.

To draw accurate figures for use in geometric studies, suitable apertures 27' may be used to mark the vertices of any required figure, whereby the figure may subsequently be drawn by connecting the vertices.

Figures 4a, 4b, 4c and 4d illustrate the method of finding trigonometric functions of an angle ABC, employing the device 11'.

(a) To find the sine and cosine of angle ABC (less than 90°): Body 12' is formed with an aperture 32' when center line 31' intersects semi-circle 17'. The distance from aperture 32' to the center point 15' is OZ, Figure 4a, and equals 100 units on scale 22'.

Mark point P on line AB so that BP equals OZ or 100. Device 11' is then placed on the angle ABC with the base line 16' on BC and line 31, overlying point P. Arm 20' is swung so that line 21' registers with line 31', and OP is measured by means of index sleeve 23' on scale 22', giving sin ABC (times 100). By swinging arm 20' so that line 21' registers with line OB, line OB may be measured on scale 22', giving cos ABC (times 100).

(b) To find the tangent or cotangent of angle ABC (less than 90°): If the angle ABC is less than 45° mark P' on BC so that BP' equals OZ. Place device 11' on the angle with point 15' on P', and with arm 20 in its 90° position, with line 21' intersecting AB at Q. Measure PQ on scale 22' to give tan ABC (times 100), Figure 4a.

Figure 4A:
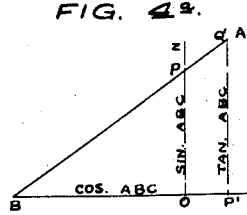
Figure 4a, 4b, 4c and 4d illustrate the manner in which the device of Figure 3 may be employed to measure the trigonometric functions of angles.
Figure 4B:
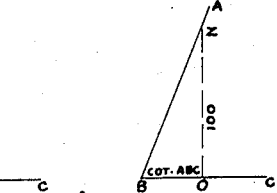

If angle ABC is greater than 45°, move the base line 16' along BC so that point 15' falls on BC and aperture 32' (point Z) falls on AB, Figure 4b. Then swing arm 20' to the left to measure OB, which gives cot ABC (times 100).

Figure 4C:
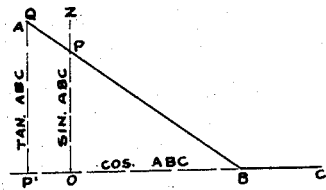
Figure 4D:

Similar procedures, illustrated in Figures 4c and 4d, are followed to measure the sine, cosine, and tangent or cotangent when angle ABC is greater than 90°.

While certain specific embodiments of an improved mathematical instrument have been disclosed in the foregoing description, it will be understood that various modifications within the spirit of the invention may occur to those skilled in the art. Therefore, it is intended that no limitations be placed on the invention except as defined by the scope of the appended claims.

I claim:

1. A mathematical instrument of the character described comprising a generally semi-circular protractor having uniformly spaced angle markings along its arcuate margin comprising angle value numerals ranging from zero to 180, a series of hyperbolic spirals inscribed on said protractor, each of said spirals having its origin at the center of the protractor and passing through one of said angle markings, a straight index arm pivotally connected to the protractor at said center for rotation parallel to the protractor, and a uniformly spaced scale of numerical markings on said arm extending from said center to the arcuate margin of the protractor and comprising numbers ranging from zero at the center to 100 at said arcuate margin.

2. The structure of claim 1, and an additional curve inscribed on said protractor, said additional curve extending from the margin of the protractor toward the side thereof having the lower numbered angle markings and passing through points on the respective spirals located at distances from the center of the protractor, as measured by said scale, equal to the square roots of the angle markings of the spirals multiplied by a power of 10.

3. The structure of claim 2, and an additional scale on said arm and extending from the center of the protractor to the arcuate margin thereof, said additional scale comprising numerals located adjacent the markings of the first-named scale and being equal to the numerical values of said markings multiplied by the square root of 10.

4. The structure of claim 1, and a transparent sleeve member slidably mounted on said arm and having an index line inscribed thereon extending transverse to said arm.

5. A mathematical instrument of the character described comprising a generally semi-circular protractor having uniformly spaced angle markings along its arcuate margin comprising angle value numerals ranging from zero to 180, a corresponding set of numerals ranging from zero to 180 times the square root of 10, a series of hyperbolic spirals inscribed on said protractor, each of said spirals having its origin at the center of the protractor and passing through one of said angle markings, a straight index arm pivotally connected to the protractor at said center for rotation parallel to the protractor, and a uniformly spaced scale of numerical markings on said arm extending from said center to the arcuate margin of the protractor and comprising numbers ranging from zero at the center to 100 at said arcuate margin.

References Cited in the file of this patent

UNITED STATES PATENTS

| | | |
|---|---|---|
| 748,566 | Pierce | Dec. 29, 1903 |
| 1,896,432 | Van Winkle | Feb. 7, 1933 |
| 2,049,245 | Breitbarth | July 28, 1936 |
| 2,436,352 | Downs | Feb. 17, 1948 |
| 2,535,374 | Skolnik | Dec. 26, 1950 |
| 2,547,745 | Cade et al. | Apr. 3, 1951 |
| 2,658,672 | Dalzell | Nov. 10, 1953 |
| 2,701,096 | Wattier | Feb. 1, 1955 |
| 2,761,619 | Vernon et al. | Sept. 4, 1956 |

FOREIGN PATENTS

| | | |
|---|---|---|
| 248,620 | Great Britain | Mar. 11, 1926 |